(12) United States Patent
Grethel et al.

(10) Patent No.: US 11,248,663 B2
(45) Date of Patent: Feb. 15, 2022

(54) CLUTCH UNIT WITH TORSIONAL VIBRATION DAMPER AS A CLUTCH SUPPORT, AND HYBRID MODULE COMPRISING CLUTCH UNIT

(71) Applicant: Schaeffler Technologies AG & Co. KG, Herzogenaurach (DE)

(72) Inventors: Marco Grethel, Bühlertal (DE); Loyal George MacMillian, Karlsruhe (DE); Carsten Mayer, Lohr a. Main (DE); Markus Baehr, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/968,832

(22) PCT Filed: Jan. 15, 2019

(86) PCT No.: PCT/DE2019/100028
§ 371 (c)(1),
(2) Date: Aug. 10, 2020

(87) PCT Pub. No.: WO2019/154455
PCT Pub. Date: Aug. 15, 2019

(65) Prior Publication Data
US 2021/0003178 A1    Jan. 7, 2021

(30) Foreign Application Priority Data

Feb. 12, 2018 (DE) .......................... 102018103065.7

(51) Int. Cl.
*F16D 21/00* (2006.01)
*B60K 17/02* (2006.01)
(Continued)

(52) U.S. Cl.
CPC .............. *F16D 21/00* (2013.01); *B60K 17/02* (2013.01); *F16F 15/145* (2013.01); *B60K 6/20* (2013.01);
(Continued)

(58) Field of Classification Search
CPC .. F16D 21/00; F16D 2300/22; F16D 2300/00; F16D 2011/006; F16D 11/00;
(Continued)

(56) References Cited

U.S. PATENT DOCUMENTS

2014/0151178 A1* 6/2014 Appeltauer ............. F16D 23/12
192/48.5
2018/0031052 A1 2/2018 Diemer
(Continued)

FOREIGN PATENT DOCUMENTS

CN          1991208 A    7/2007
CN          102422054 A  4/2012
(Continued)

*Primary Examiner* — Mark A Manley

(57) ABSTRACT

A clutch unit for a powertrain of a motor vehicle is disclosed, comprising a torque input component acting as a drive element and a torque output component acting as an output element, which can be connected to transmit a torque to the torque input component through a clutch which can be switched through friction elements, the clutch having two partial clutches by which the torque input component and the torque output component can be connected so as to transmit a torque, in which one of the two partial clutches is configured as a positive-fit clutch and the other of the two partial clutches is configured as a friction clutch. In addition, the disclosure relates to a hybrid module with a first drive machine the output shaft of which can be connected through such a clutch unit to an output shaft of a second drive machine or a transmission input shaft.

20 Claims, 3 Drawing Sheets

(51) Int. Cl.
*F16F 15/14* (2006.01)
*B60K 6/20* (2007.10)
*B60K 6/387* (2007.10)

(52) U.S. Cl.
CPC .......... *B60K 6/387* (2013.01); *B60Y 2200/92* (2013.01); *F16D 2300/00* (2013.01); *F16D 2300/22* (2013.01)

(58) Field of Classification Search
CPC .......... B60K 17/02; B60K 6/20; B60K 6/387; F16F 15/145
See application file for complete search history.

(56) References Cited

U.S. PATENT DOCUMENTS

2020/0232519 A1  7/2020  Viernekes et al.
2021/0054883 A1* 2/2021  Grethel ................ F16D 13/683

FOREIGN PATENT DOCUMENTS

| | | |
|---|---|---|
| CN | 105387097 A | 3/2016 |
| CN | 105531515 A | 4/2016 |
| CN | 107110235 A1 | 8/2017 |
| CN | 107202147 A1 | 9/2017 |
| CN | 107532678 A | 1/2018 |
| CN | 206943255 U | 1/2018 |
| DE | 3941251 A1 | 6/1990 |
| DE | 102009032336 A1 | 2/2010 |
| DE | 102009003108 A1 | 11/2010 |
| DE | 102010054545 A1 | 8/2011 |
| DE | 102011084641 A1 | 4/2012 |
| DE | 102011017660 A1 | 10/2012 |
| DE | 102015211436 A1 | 1/2016 |
| DE | 102015209898 A1 | 12/2016 |
| DE | 102016220576 A1 | 4/2017 |
| DE | 102015221368 A1 | 5/2017 |
| WO | 2014058239 A1 | 4/2014 |

* cited by examiner

CLUTCH UNIT WITH TORSIONAL VIBRATION DAMPER AS A CLUTCH SUPPORT, AND HYBRID MODULE COMPRISING CLUTCH UNIT

CROSS-REFERENCE TO RELATED APPLICATIONS

This application is the U.S. National Phase of PCT Appln. No. PCT/DE2019/100028 filed Jan. 15, 2019, which claims priority to DE 10 2018 103 065.7 filed Feb. 12, 2018, the entire disclosures of which are incorporated by reference herein.

TECHNICAL FIELD

The disclosure relates to a clutch unit for a powertrain of a motor vehicle, with a torque input component acting as a drive element, for example a crankshaft or a part attached to the crankshaft, in particular for torque input of a first drive machine, such as in particular an internal combustion engine, and a torque output component acting as an output element, for example, such as a transmission input shaft or an output shaft of a second drive machine, in particular of an electrical machine, in which the torque output component can be connected so as to transmit a torque to the torque input component preferably via a clutch, in particular via a separating clutch, which can be switched through use of friction elements such as friction linings and/or plates, in which the clutch has two partial clutches by means of which the torque input component and the torque output component can be connected so as to transmit a torque. In addition, the disclosure relates to a hybrid module having a first drive machine, the output shaft of which is connectable through such a clutch unit to an output shaft of a second drive machine or a transmission input shaft.

BACKGROUND

Such clutch units are already known from the state of the art. For example, DE 10 2009 032 336 A1 discloses a torque transmission device for the powertrain of a vehicle between a crankshaft of an internal combustion engine and a transmission input shaft of a transmission, comprising a separating clutch and a dual-mass flywheel, the dual-mass flywheel and the separating clutch being arranged in series between the crankshaft and the transmission input shaft, with the dual-mass flywheel being arranged on the crankshaft side and the separating clutch being arranged on the transmission input shaft side.

DE 10 2010 054 545 A1 also discloses a device for transmitting torque for the powertrain of a vehicle between a crankshaft of an internal combustion engine and a transmission input shaft of a drive, comprising a separating clutch and a dual-mass flywheel, in which the dual-mass flywheel and the separating clutch are arranged in series between the crankshaft and the transmission input shaft, in which the dual-mass flywheel is arranged on the crankshaft side and the separating clutch is arranged on the transmission input shaft side, and in which a rotor of the electric drive radially encloses parts of the separating clutch, in which the separating clutch is a multi-plate clutch.

However, the state of the art always has the disadvantage that such a clutch unit with an upstream torsional vibration damper requires a large installation space and the costs for reducing rotational irregularities are very high. The state of the art also has the disadvantage that wet-running, friction-based separating clutches also have high losses due to drag torques, while dry-running, friction-based separating clutches also require a large installation space and, in the case of positive-fit separating clutches, controllability is also hard to achieve.

SUMMARY

It is therefore the object of the disclosure to avoid or at least reduce the disadvantages resulting from the prior art. In particular, a clutch unit is to be developed which preferably fulfills the function of a separating clutch on the one hand and the function of reducing rotational irregularities on the other hand, while at the same time reducing the required installation space and costs. In particular, a separating clutch must be provided which is low-loss, requires little installation space, has good controllability and can be manufactured at low cost.

The object according to the disclosure is achieved in a generic device according to the disclosure by the fact that the clutch has two partial clutches by means of which the torque input component and the torque output component can be connected so as to transmit a torque, one of the two partial clutches being configured as a positive-fit clutch and the other of the two partial clutches being configured as a friction clutch.

This has the advantage that it is possible to design the two partial clutches differently, so that the functions of the separating clutch can be divided between the partial clutches. Thus, a friction clutch can be used for one function of the separating clutch, in particular a start of the first drive machine, and a positive-fit clutch can be used for another function of the separating clutch, in particular the coupling of the first drive machine, in order to be able to combine the advantages of both types of clutch. The object of the disclosure is thus achieved by a specific allocation of the functions to the two separating clutches, so that a high controllability for an engine start with lower torque requirement is achieved by the friction clutch and higher torques can be transmitted by the positive-fit clutch. This leads to a reduction in clutch losses and the required installation space as well as to an improvement in the controllability of the clutch and to an optimal cost structure.

Advantageous embodiments are claimed in the claims and are explained in more detail below.

In addition, it is useful if the clutch unit has a torsional vibration damper with two masses damped with respect to each other to reduce rotational irregularities, in particular of the internal combustion engine, which is arranged between the torque input component and the torque output component, at least one of the two masses of the torsional vibration damper being configured simultaneously as a support for a friction element. This has the advantage that the function for reducing rotational irregularities is integrated into the assembly, which fulfills the functions of the separating clutch (K0). In this way, axial installation space can be saved in an advantageous manner and the costs for the reduction of rotational irregularities can be kept low.

In addition, it is advisable if at least one of the masses carrying/receiving the friction element is configured as a plate support.

It is also advantageous if clutch and torsional vibration damper are at least partially, preferably completely, arranged in the same area in the axial direction. This means that the clutch and the torsional vibration damper are arranged at the same axial height. This allows the total axial length to be reduced by the axial length for the function to reduce rotational irregularities.

It is advantageous if the clutch and the torsional vibration damper are radially nested, i.e., arranged in radial direction one behind the other/on top of the other. This radial nesting thus saves considerable axial installation space, namely the axial installation space otherwise required for the torsional vibration damper.

It is also useful if the torsional vibration damper is arranged external to the clutch in radial direction. It is particularly preferred if the torsional vibration damper is arranged in such a way that it radially surrounds the clutch. In this way, the mass moment of inertia can be advantageously increased.

In an alternative embodiment it is also possible to arrange the torsional vibration damper radially inwards from the clutch in such a way that the clutch radially surrounds the torsional vibration damper.

It is advantageous if the positive-fit clutch is configured as a shift dog device/dog clutch. In particular, it is advantageous if the positive-fit clutch is arranged and configured in such a way that it serves to couple the combustion engine to the powertrain, i.e., if the transmission input shaft of the motor vehicle is driven by the combustion engine. This is an advantageous manner of ensuring that the output shaft of the combustion engine is coupled to the transmission input shaft without slippage and with very low losses.

It is also advantageous if the friction clutch is configured as a single-disc/multi-disc/multi-plate clutch. This prevents the torque from being transmitted abruptly when the friction clutch is closed.

It is also advantageous if the friction clutch and the positive-fit clutch have independent or separate clutch stops to limit any clutch movement.

It is advantageous if the friction clutch is arranged and configured in such a way that it serves to start the internal combustion engine through the second drive machine/electrical machine. To start the combustion engine, an output shaft of the electric motor is therefore coupled to the combustion engine through the friction clutch, so that the torque applied by the electric motor can be used for starting, i.e., for tow starting the combustion engine.

In a preferred embodiment, the friction surfaces of the friction clutch are flat or conical/tapered.

In addition, it is useful if one direction of action of one partial clutch is opposite to the direction of action of the other partial clutch. This means that actuating surfaces of different sizes can be used for the two partial clutches. In addition, this enables an easy engaging and disengaging for connection via the positive-fit clutch and bridging/uncoupling of the torsional vibration damper when connecting via the friction clutch.

It is also advantageous if the actuating surfaces of the friction partial clutch are of different sizes compared to the actuating surfaces of the positive-fit partial clutch. This has the advantage that no compromise must be made between the required driving force for the friction clutch and the required actuation speed for the positive-fit clutch.

It is also advantageous if the torsional vibration damper is arranged so that it is decoupled from the powertrain when the positive-fit partial clutch is not operated. This means that the torsional vibration damper is bypassed when the friction partial clutch is closed and the positive-fit partial clutch is open. This means that the torsional vibration damper is only a part of the powertrain when the positive-fit partial clutch is closed. This means that the torsional vibration damper does not have to be tow started when the internal combustion engine is carried along, but is only in the powertrain if a reduction of rotational irregularities is also required.

It is also possible that an actuation direction in which the partial clutches to be actuated are moved is identical for one partial clutch with an actuation direction of the other separating clutch. This means that both partial clutches are operated in the same direction of actuation. In particular, an actuation system for actuating the two partial clutches is arranged and configured in such a way that the actuation of the friction partial clutch takes place before the actuation of the positive-fit partial clutch. In this way, it is achieved in a simple manner that the combustion engine is first tow-started through the actuation of the friction partial clutch before being coupled to the transmission input shaft through the actuation of the positive-fit partial clutch to drive the motor vehicle.

It is also advantageous if the two partial clutches are configured in such a way that they are operated through a rotary feedthrough. In this way, both the required contact pressure for the friction clutch and the required speed for the positive-fit clutch can be achieved.

It is particularly advantageous if the rotary feedthrough is carried out on small friction diameters. In this way a loss torque is kept low.

In addition, it is appropriate that the two partial clutches are arranged so that they are operated by a common control system. This eliminates the need for additional elements for actuation.

In addition, it is advantageous if the clutch unit according to the disclosure is used in a wet-running system, as then an actuation through rotary feedthroughs can be easily integrated.

It is advantageous when the torsional vibration damper is configured as a dual-mass flywheel in which a primary flywheel mass is arranged on the engine/primary side, i.e., on the side of the combustion engine, and a secondary flywheel mass is arranged on the transmission side/secondary side.

In a preferred embodiment, the friction partial clutch and the positive-fit partial clutch are connected to a secondary side/on a secondary mass of the dual-mass flywheel, i.e., to a transmission side of the dual-mass flywheel.

It is advantageous here if the friction partial clutch is arranged towards the engine/combustion engine or the positive-fit partial clutch is arranged towards the engine. It is also preferred if the friction partial clutch is configured as a cone clutch with conically arranged friction elements.

In another preferred embodiment, the friction partial clutch is connected to a primary side/primary mass of the dual-mass flywheel and the positive-fit partial clutch is connected to a secondary side/secondary mass of the dual-mass flywheel.

It is advantageous if the two partial clutches are axially nested or the two partial clutches are radially nested. This allows the required installation space to be kept very small.

In another advantageous embodiment, detents are provided on the clutch which, when the positive-fit partial clutch is actuated, facilitate adjustment to an end position in which a claw of the dog clutch is inserted, i.e., the positive-fit partial clutch is closed, and to a middle position in which both partial clutches are not actuated. This improves the controllability of the positive-fit partial clutch and a "normally-stay" behavior.

The task according to the disclosure is also solved by a hybrid module, e.g., for a P2 hybrid application, with a first drive machine, in particular an internal combustion engine, the output shaft of which can be connected through a clutch unit according to the disclosure to an output shaft of a second drive machine, in particular an electrical machine, or a transmission input shaft.

It is advantageous if the output shaft of the first drive machine serves as the torque input component and/or the output shaft of the second drive machine or the transmission input shaft serves as the torque output component. It is also useful if a friction partial clutch of the clutch is/are used to start the first drive machine via the output shaft of the second drive machine and/or a positive-fit partial clutch of the clutch is/are used for the slip-free coupling of the first drive machine to the output shaft of the second drive machine or to the transmission input shaft.

In other words, the disclosure relates to an assembly in which the function of the separating clutch and the function for reducing rotational irregularities of an internal combustion engine are combined. These two functions are essentially radially nested to keep the axial length as short as possible. The function to reduce rotational irregularities is radially outwards and the function of the separating clutch is radially inwards. To reduce rotational irregularities, e.g., a two-mass flywheel or a centrifugal pendulum can be used.

In addition, the functions of the separating clutch are divided into a function for coupling of the combustion engine to the transmission and a function for tow starting the combustion engine. A positive element (a shift claw device) is used for coupling to the combustion engine and a modulated friction element is used for tow starting. The friction element can be designed with one or more surfaces, flat or conical.

The movement directions for the two functions can be identical or in opposite directions. If the functions are implemented in one direction of movement, the "friction function" is first performed before the slip-free "coupling function" when starting combustion. Irrespective of the operation in the same or opposite direction, the realization of the "coupling" function is characterized by the fact that after the performance of the movement to activate the function there is no or very little loss. Executing the functions in the opposite direction is advantageous because, on the one hand, for the clutch function a simple active engaging and disengaging can be bridged and, on the other hand, for the "tow starting" function the function for reducing rotational irregularities during the start procedure can be bridged, thus significantly reducing the mechanical load thereof. In addition, this allows the use of actuating surfaces of different sizes, so that no compromise need be made between the required contact pressure of the friction element and the required actuating speed of the dog device. In wet-running systems, both functions can be operated advantageously through the shafts and rotary feedthroughs at small friction diameters.

BRIEF DESCRIPTION OF THE DRAWINGS

In what follows, the disclosure is explained by means of drawings. Herein.

The drawings are of a schematic nature only and serve exclusively to understand the disclosure. The same elements are marked with the same reference signs. Different features of the exemplary embodiments can be exchanged.

DETAILED DESCRIPTION

Figure 1:
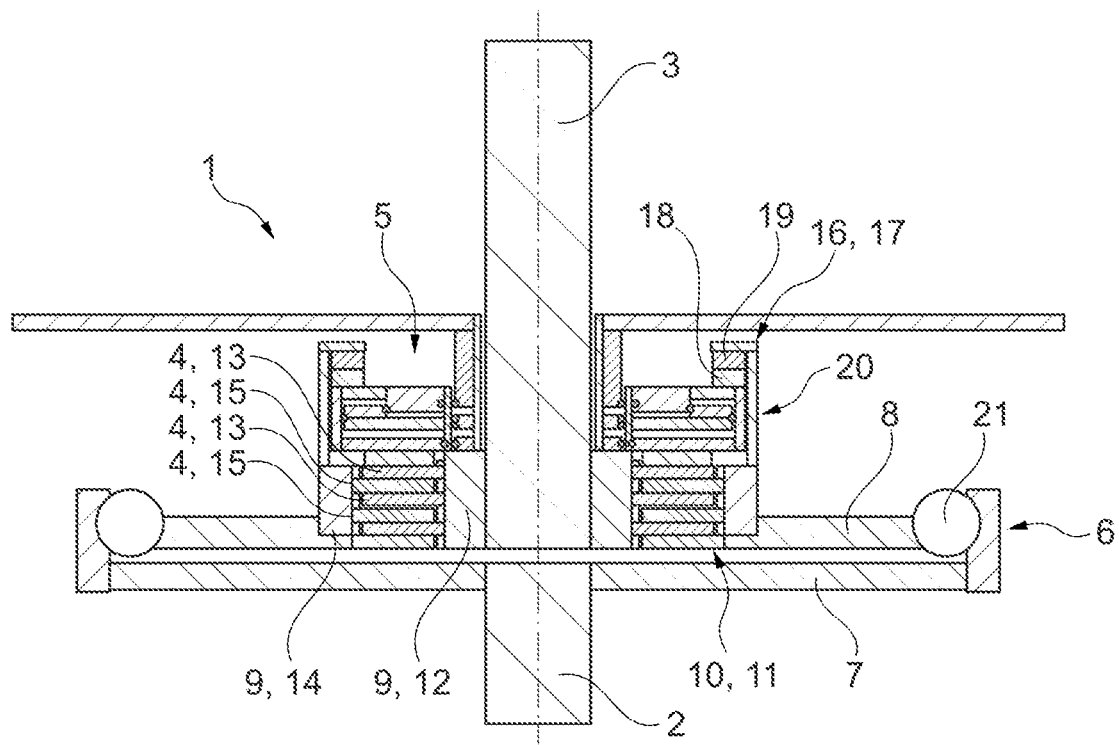
FIG. 1 shows a longitudinal section of a clutch unit according to the disclosure in a first exemplary embodiment with a friction partial clutch and a positive-fit partial clutch of a separating clutch connected to a secondary mass of a torsional vibration damper, in which the friction partial clutch is arranged in the direction of a first drive machine.

FIG. 1 shows a clutch unit 1 for a powertrain of a motor vehicle. The clutch unit 1 has a torque input component 2, which acts as an input element (or as an output element), and a torque output component 3, which acts as an output element (or as an input element). The torque output component 3 can be connected so as to transmit a torque to the torque input component 2 through a clutch/separating clutch 5 which can be engaged and disengaged through friction element 4. The clutch unit 1 also has a torsional vibration damper 6 to reduce rotational irregularities, which is configured as a dual-mass flywheel. The torsional vibration damper 6 has a primary mass 7, which is connected to the torque input component 2, and a secondary mass 8, which is connected to the torque output component 3 through the clutch 5. The primary mass 7 is damped relative to the secondary mass 8. The primary mass 7 or the secondary mass 8 also serves as a support 9 for a friction element 4 of the clutch 5 or is formed in one piece with the support 9.

The clutch 5 has a friction partial clutch 10, which is configured as a multi-plate clutch 11. When the friction partial clutch 10 is closed, the torque input component 2 and the torque output component 3 are connected so as to transmit a torque. The multi-plate clutch 11 has an internal plate support 12, which receives the internal plates 13 in a rotationally fixed but axially displaceable manner, and an external plate support 14, which receives the external plates 15 in a rotationally fixed but axially displaceable manner. The internal plates 13 and the external plates 15 serve as friction elements 4. The external plate support 14 is integrated with the primary mass 7 or the secondary mass 8. In a first exemplary embodiment shown in FIG. 1, the external plate support 14 is formed in one piece with the secondary mass 8.

The torsional vibration damper 6 is arranged at the same axial height as the clutch 5, so that the torsional vibration damper 6 and the clutch 5 are arranged to be radially nested. The torsional vibration damper 6 is arranged to be radially external the clutch 5, so as to surround the clutch radially.

The clutch 5 has a positive-fit partial clutch 16, which is configured as a dog clutch/dog shift device 17. When the positive-fit partial clutch 16 is closed, the torque input component 2 and the torque output component 3 are connected so as to transmit a torque. The dog clutch 17 has a claw 18 on the torque output component side and a claw 19 on the torque input component side.

The positive-fit partial clutch 16 and the friction partial clutch 10 are actuated by a rotary feedthrough 20. In this case an actuation direction of the positive-fit partial clutch 16 is opposite to an actuation direction of the friction partial clutch 10. The working directions can also be identical, even if this is not shown in the drawings.

In all embodiments, the friction partial clutch 10 and the positive-fit partial clutch 16 have independent or separate stops, which distinguishes clutch unit 1 from a classic transmission synchro unit.

In the first exemplary embodiment according to FIG. 1, the external plate support 14 for the friction partial clutch 10 and the torque input component-side claw 19 for the positive-fit partial clutch 16 are fixedly connected to the secondary mass 8 of the torsional vibration damper 6. The secondary mass 8 is coupled to the primary mass 7 by a spring 21. The friction partial clutch 10 is arranged in the direction of the engine, i.e., closer to the torque input part 2, and the positive-fit partial clutch is arranged in the direction of the drive, i.e., closer to the torque output part 3 or to the transmission input shaft. The rotary feedthrough is arranged in axial direction between the positive-fit partial clutch 16 and the friction partial clutch 10.

Figure 2:
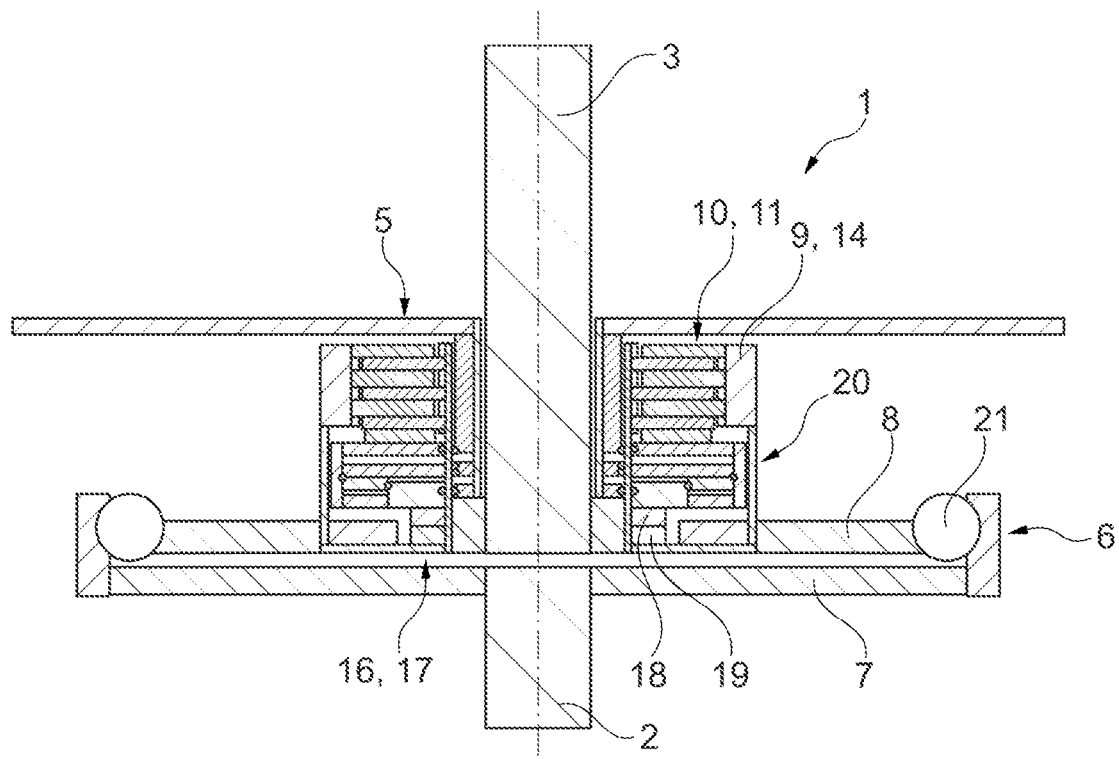
FIG. 2 shows a longitudinal section of the clutch unit in a second exemplary embodiment with the friction partial clutch and the positive-fit partial clutch connected to the secondary mass of the torsional vibration damper, the positive-fit partial clutch being arranged in the direction of the first drive machine.

In the second exemplary embodiment shown in FIG. 2, the external plate support 14 for the friction partial clutch 10 and the torque input component-side claw 19 for the positive-fit partial clutch 16 are fixedly connected to the secondary mass 8 of the torsional vibration damper 6. The friction partial clutch 10 is arranged in the direction of the drive, i.e., closer to torque output component 3, and the positive-fit partial clutch is arranged in the direction of the engine, i.e., closer to torque input component 2 or transmission input shaft. The rotary feedthrough is arranged in axial direction between the positive-fit partial clutch 16 and the friction partial clutch 10.

Figure 3:
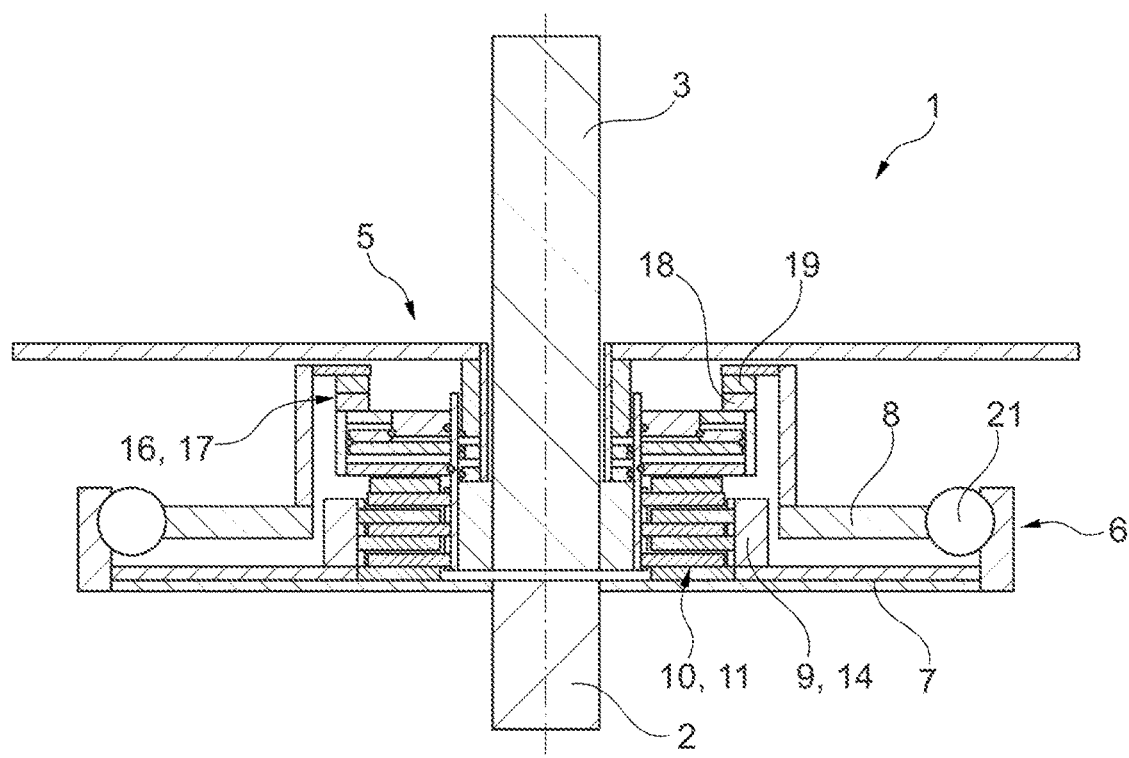
FIG. 3 shows a longitudinal section of the clutch unit in a third exemplary embodiment with the partial clutch frictionally connected to a primary mass of the torsional vibration damper and the partial clutch positively connected to the secondary mass of the torsional vibration damper, in which the partial clutches are arranged to be axially nested.

In the third exemplary embodiment in FIG. 3, the external plate support 14 for the friction partial clutch 10 is fixedly connected to the primary mass 7 of the torsional vibration damper 6 and the torque input component-side claw 19 for the positive-fit partial clutch 16 is fixedly connected to the secondary mass 8 of the torsional vibration damper 6. The friction partial clutch 10 is arranged in the direction of the engine, i.e., closer to the torque input part 2, and the positive-fit partial clutch is arranged in the direction of the drive, i.e., closer to the torque output part 3 or to the transmission input shaft. The partial clutches 10, 16 are arranged to be nested in axial direction. The rotary feedthrough is arranged in axial direction between the positive-fit partial clutch 16 and the friction partial clutch 10.

Figure 4:
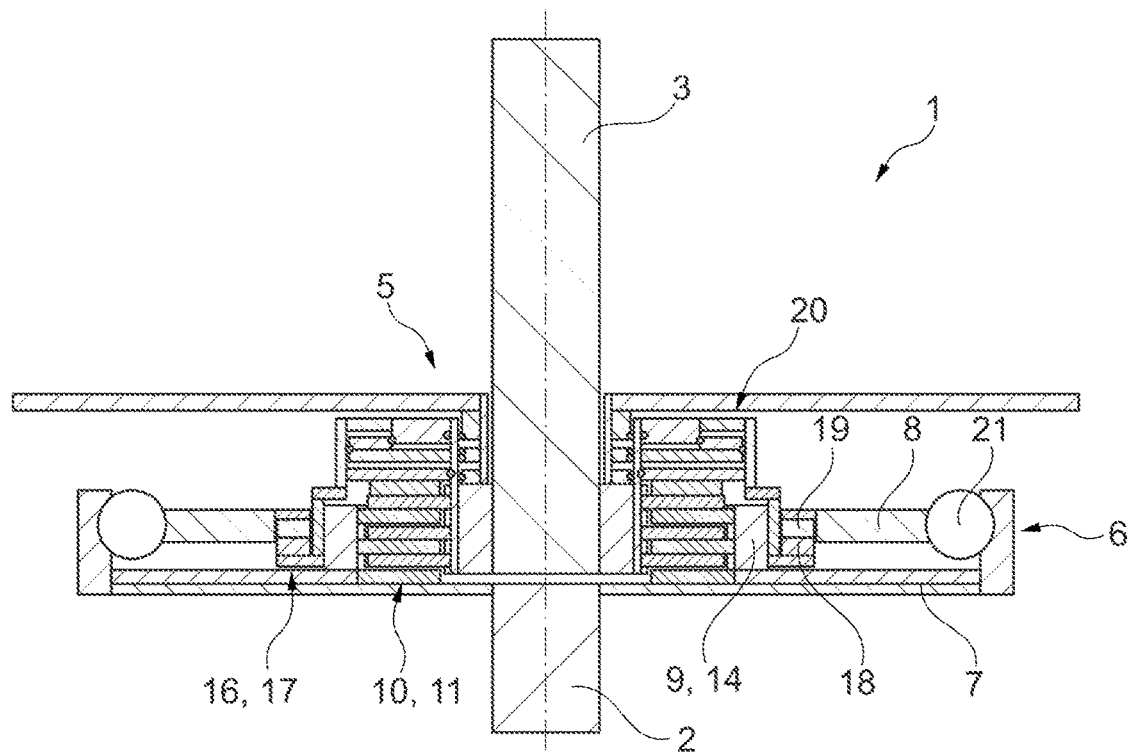
FIG. 4 shows a longitudinal section of the clutch unit in a fourth exemplary embodiment with the friction partial clutch bound to the primary mass of the torsional vibration damper and the positive-fit partial clutch connected to the secondary mass of the torsional vibration damper, in which the partial clutches are arranged to be radially nested.

In the fourth exemplary embodiment according to FIG. 4, the external plate support 14 for the friction partial clutch 10 is fixedly connected to the primary mass 7 of the torsional vibration damper 6 and the torque input component-side claw 19 on the component side for the positive-fit partial clutch 16 is fixedly connected to the secondary mass 8 of the torsional vibration damper 6. The partial clutches 10, 16 are arranged to be nested in radial direction, in which the positive-fit partial clutch 16 is arranged radially external the friction partial clutch 10. The two partial clutches 10, 16 are on the motor side and the rotary feedthrough 20 is located on the gear side.

Figure 5:
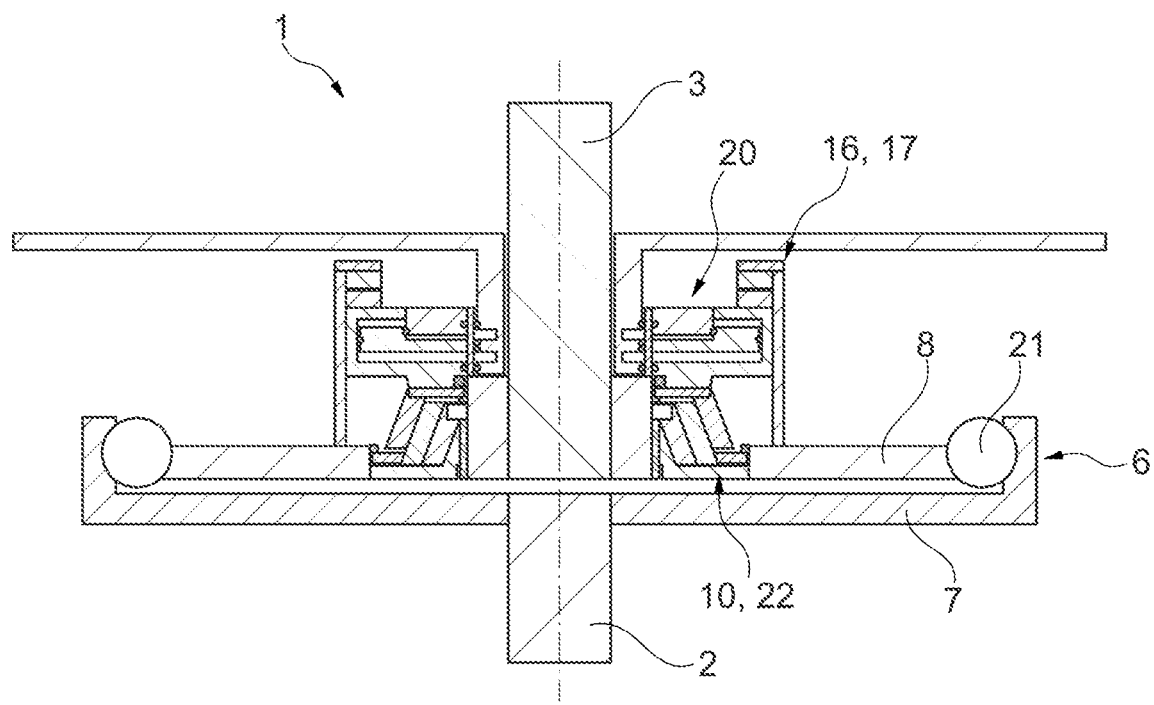
FIG. 5 shows a longitudinal section of the clutch unit in a fifth exemplary embodiment with a friction partial clutch configured as a cone clutch.

FIG. 5 shows clutch unit 1 in a fifth exemplary embodiment, which corresponds to the first exemplary embodiment in all features, with the exception of the feature that the friction clutch 10 is configured as a cone clutch 22 with conical/tapered friction linings and not as in the first exemplary embodiment as a multi-plate clutch with flat friction linings.

Figure 6:
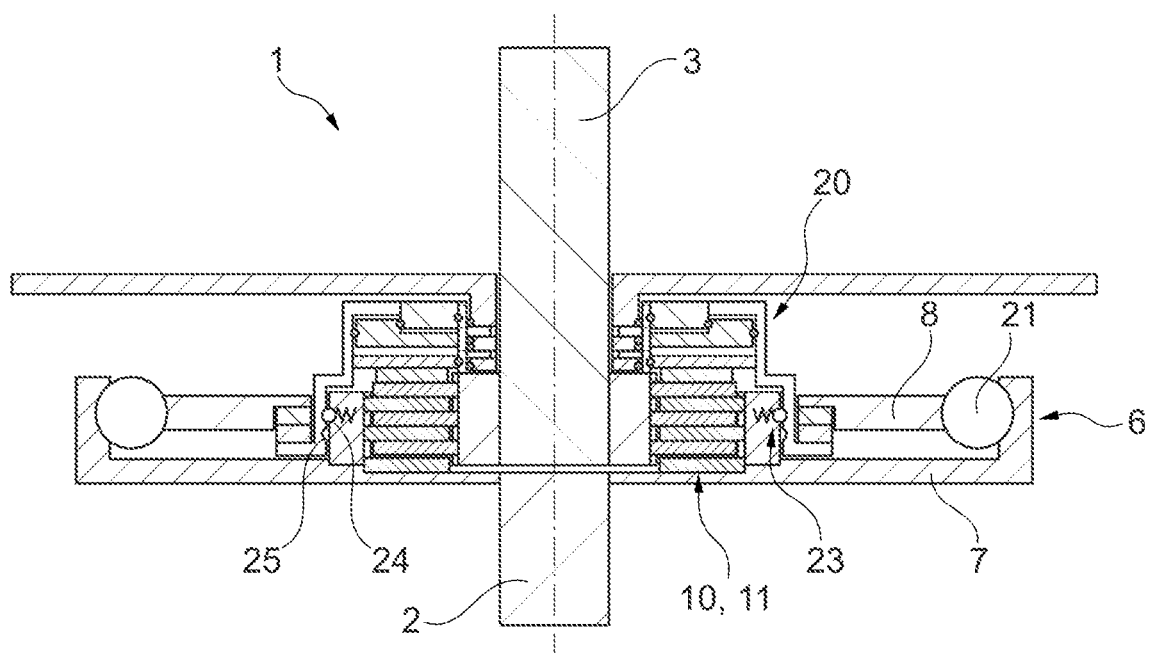
FIG. 6 shows a longitudinal section of the clutch unit in a sixth exemplary embodiment with detents for the positive-fit partial clutch.

FIG. 6 shows clutch unit 1 in a sixth exemplary embodiment, which corresponds to the fourth exemplary embodiment in all characteristics, with the exception of the additional characteristic that detents 23 are present in the sixth exemplary embodiment. The detents 23 have a spring-loaded ball 24 which engages in corresponding recesses 25 when the dog clutch 17 is brought into an end position in which the claws 18, 19 are inserted, i.e., the dog clutch 17 is actuated, or into a middle position in which the dog clutch 17 and the multi-plate clutch 11 are open.

LIST OF REFERENCE NUMBERS

1 Clutch unit
2 Torque input component
3 Torque output component
4 Friction element
5 Clutch/Separating clutch
6 Torsional vibration damper
7 Primary mass
8 Secondary mass
9 Plate support
10 Friction partial clutch
11 Multi-plate clutch
12 Internal plate support
13 Internal plate
14 External plate support
15 External plate
16 Positive-fit partial clutch
17 Dog clutch
18 Claw
19 Claw
20 Rotary feedthrough
21 Spring
22 Cone clutch
23 Detent
24 Ball
25 Recess

The invention claimed is:

1. A clutch unit for a powertrain of a motor vehicle, comprising: a torque input component acting as a drive element; a torque output component acting as an output element, configured to be connected to transmit a torque to the torque input component through a switchable clutch, in which the clutch includes two partial clutches, configured to selectively connect the torque input component and the torque output component to transmit the torque, wherein one of the two partial clutches is a positive-fit clutch and the other of the two partial clutches is a multi-plate friction clutch; and a dual mass flywheel having a primary mass connected to the torque input component and a secondary mass connected to the torque output component, wherein an external plate arranged to support a plurality of external clutch plates of the multi-plate clutch is integrally formed in one piece with the primary mass or the secondary mass, and wherein the secondary mass is directly coupled to the primary mass by a spring.

2. The clutch unit according to claim 1, wherein an actuation direction of one partial clutch is opposite to an actuation direction of the other partial clutch.

3. The clutch unit according to claim 1, wherein the dual mass flywheel is arranged in such a way that it is decoupled from the powertrain when the positive-fit clutch is not actuated.

4. The clutch unit according to claim 1, wherein an actuation direction of the two partial clutches is identical.

5. The clutch unit according to claim 1, wherein the friction clutch and the positive-fit clutch have independent clutch stops for limiting any clutch movement.

6. A hybrid module with a first drive machine, an output shaft of which can be connected through the clutch unit to an output shaft of a second drive machine or a transmission input shaft according to claim 1.

7. The clutch unit according to claim 1, wherein the clutch and the dual mass flywheel are arranged to be radially nested.

8. The clutch unit according to claim 7, wherein the dual mass flywheel is arranged to be external the clutch in a radial direction.

9. A hybrid module with a first drive machine, an output shaft of which can be connected through the clutch unit to an output shaft of a second drive machine or a transmission input shaft according to claim 1.

10. The clutch unit according to claim 1, wherein the two partial clutches are actuated by a rotary feedthrough, the rotary feedthrough being arranged in an axial direction between the clutches such that the rotary feedthrough abuts the external plate.

11. The clutch unit according to claim 1, wherein the spring is arranged fully radially outside of the two partial clutches.

12. A clutch unit for a powertrain of a motor vehicle, comprising:
    a torque input component acting as a drive element;
    a torque output component acting as an output element, configured to be connected to transmit a torque to the torque input component through a switchable clutch, in which the clutch includes two partial clutches, configured to selectively connect the torque input component and the torque output component to transmit the torque, wherein one of the two partial clutches is a positive-fit clutch and the other of the two partial clutches is a multi-plate friction clutch; and
    a dual mass flywheel having a primary mass connected to the torque input component and a secondary mass connected to the torque output component, wherein an external plate arranged to support a plurality of external clutch plates of the multi-plate clutch is integrally formed in one piece with the primary mass or the secondary mass, and wherein the secondary mass is directly coupled to the primary mass by a damper.

13. The clutch unit according to claim 12, wherein an actuation direction of one partial clutch is opposite to an actuation direction of the other partial clutch.

14. The clutch unit according to claim 12, wherein the dual mass flywheel is decoupled from the powertrain when the positive-fit clutch is not actuated.

15. The clutch unit according to claim 12, wherein an actuation direction of the two partial clutches is identical.

16. The clutch unit according to claim 12, wherein the friction clutch and the positive-fit clutch have independent clutch stops for limiting any clutch movement.

17. The clutch unit according to claim 12, wherein the clutch and the dual mass flywheel are arranged to be radially nested.

18. The clutch unit according to claim 17, wherein the dual mass flywheel is arranged to be external the clutch in a radial direction.

19. The clutch unit according to claim 12, wherein the two partial clutches are actuated by a rotary feedthrough, the rotary feedthrough being arranged in an axial direction between the clutches such that the rotary feedthrough abuts the external plate.

20. The clutch unit according to claim 12, wherein the damper is arranged fully radially outside of the two partial clutches.

* * * * *